US012725559B2

(12) United States Patent
Maa et al.

(10) Patent No.: US 12,725,559 B2
(45) Date of Patent: Sep. 1, 2026

(54) DUAL DISPLAY SYSTEM WITH DUAL REFRESH FREQUENCIES

(71) Applicant: Aleddra Inc., Renton, WA (US)

(72) Inventors: Chia-Yiu Maa, Bellevue, WA (US); Li-Jyuan Luo, Taipei City (TW)

(73) Assignee: Aleddra Inc., Renton, WA (US)

( * ) Notice: Subject to any disclaimer, the term of this patent is extended or adjusted under 35 U.S.C. 154(b) by 0 days.

(21) Appl. No.: 19/065,863

(22) Filed: Feb. 27, 2025

(65) Prior Publication Data

US 2026/0038417 A1 Feb. 5, 2026

Related U.S. Application Data

(63) Continuation-in-part of application No. 18/791,703, filed on Aug. 1, 2024, now Pat. No. 12,374,263.

(51) Int. Cl.
*G09G 3/20* (2006.01)
*G06F 3/14* (2006.01)

(52) U.S. Cl.
CPC ......... *G09G 3/2096* (2013.01); *G06F 3/1423* (2013.01); *G09G 2320/0693* (2013.01); *G09G 2340/0435* (2013.01)

(58) Field of Classification Search
None
See application file for complete search history.

(56) References Cited

U.S. PATENT DOCUMENTS

| | | | | |
|---|---|---|---|---|
| 8,493,399 | B1 * | 7/2013 | Bates | G09G 5/363 345/506 |
| 2013/0141642 | A1 * | 6/2013 | Wu | G09G 5/363 348/E7.001 |
| 2020/0164220 | A1 * | 5/2020 | Broeng | A61N 5/0622 |
| 2022/0208145 | A1 * | 6/2022 | Glen | G06F 3/1446 |
| 2023/0077843 | A1 * | 3/2023 | Xin | G09G 5/363 345/545 |
| 2023/0252936 | A1 * | 8/2023 | Lin | G06F 3/147 345/214 |
| 2023/0256262 | A1 * | 8/2023 | Carstensen | A61B 5/375 607/88 |
| 2023/0324035 | A1 * | 10/2023 | Maa | F21V 23/003 |
| 2024/0005838 | A1 * | 1/2024 | Von Hippel | G06F 3/1431 |
| 2024/0147587 | A1 * | 5/2024 | Maa | H05B 45/20 |
| 2024/0285968 | A1 * | 8/2024 | Broeng | A61N 5/0622 |

* cited by examiner

*Primary Examiner* — Kirk W Hermann

(74) *Attorney, Agent, or Firm* — Andy M. Han; Han IP PLLC

(57) ABSTRACT

A display system comprises a first digital display, a second digital display, and a host computer. The first digital display is configured to operate at a first refresh frequency (F1)>50 Hz, and the second digital display is configured to operate at a second refresh frequency (F2)>50 Hz, greater than F1. The difference between the F1 and the F2 may be either between 35 Hz and 45 Hz (e.g., 40 Hz) or between 3 Hz and 10 Hz (e.g., 7 Hz). The host computer controls and manages the first digital display and the second digital display.

8 Claims, 1 Drawing Sheet

| Subjects | Distance | Day 1 | Day 4 |
|---|---|---|---|
| Subject 1- Female | 150 cm | 6.39 dB | 5.37 dB |
| Subject 2 - Male | 100 cm | 4.35 dB | 5.11 dB |

DUAL DISPLAY SYSTEM WITH DUAL REFRESH FREQUENCIES

The present disclosure is a continuation-in-part (CIP) of U.S. patent application Ser. No. 18/791,703, filed 1 Aug. 2024. Content of aforementioned application is herein incorporated by reference in its entirety.

BACKGROUND

Technical Field

The present disclosure pertains to the field of digital display system and, more specifically, proposes a dual display system with dual refresh frequencies.

Description of Related Art

In U.S. patent application Ser. No. 18/791,703, a display system was introduced. It comprises a controller and a two-dimensional digital pixel panel. The pixels of the two-dimensional digital pixel panel are divided into a first group of pixels and a second group of pixels. The controller is configured to operate the first group of pixels at a first refresh frequency (F1) and to operate the second group of pixels at a second refresh frequency (F2), different than F1. The controller may support two display channels, where the first display channel feeds a graphic content to the first group of pixels at the F1 and the second display channel feeds the graphic content to the second group of pixels at the F2.

New experiments show that it may not be necessary to use one digital display having dual refresh frequencies for achieving suitable gamma stimulation to a subject. It turns out that two adjacent digital displays, each with a different refresh frequency, would result in similar gamma stimulation to a subject viewing these two displays simultaneously. The leads to the potential use of such dual display system for treating Alzheimer's disease. The present disclosure expands the ideal in U.S. patent application Ser. No. 18/791,703 to a dual digital display system with dual refresh frequencies.

SUMMARY

In one aspect, the display system comprises a first digital display, a second digital display, and a host computer. The first digital display is configured to operate at a first refresh frequency (F1)>50 Hz. The second digital display is configured to operate at a second refresh frequency (F2), greater than F1. The host computer controls and manages the first digital display and the second digital display. Take a laptop computer coupled with an extended monitor as an example. The laptop (host) computer controls and manages both its default screen (the first digital display) and the extended monitor (the second digital display). The content displayed in the first digital display is not required to be correlated to the content displayed in the second digital display. With the example just mentioned, the default screen (the first digital display) of the laptop computer may show a Word document whereas the extended monitor (the second digital display) may show a video. By having a host computer controlling and managing both displays, it enables a subject to view the contents of both displays continually and interchangeably, leading to the effect of exposing subject's eyes to both the F1 and the F2 frequencies continually, thus creating an invisible differential frequency (equal to F2−F1) in the brain of the subject. By carefully choosing the F1 and the F2 (more precisely their difference), the display system may be used for treating either Alzheimer's disease or memory degeneration.

In some embodiments, a difference between the F1 and the F2 is between 35 Hz and 45 Hz. With some embodiments, F1=60 Hz and the F2=100 Hz. With some other embodiment, the F1=80 Hz and the F2=120 Hz.

In some other embodiments, a difference between the F1 and the F2 is between 3 Hz and 10 Hz. Studies have shown that 40 Hz stimulation has the effect of improving cognitive brain function, whereas stimulation between 3 Hz and 10 Hz has the effect of improving memory recall. Thus, for treating patients with memory recall issues, the difference between the F1 and the F2 is chosen to be between 3 Hz and 10 Hz in some embodiments.

The display system of the present disclosure includes, but not limited to, digital computer monitor, digital television screen, laptop computer display, tablet computer, smartphone, and the combination thereof. It also applies to devices with dual (or more) displays, e.g., bi-fold or tri-fold smartphones. The present disclosure further includes any electronic googles (smart googles) with dual lenses where the content shown on one lens is displayed at F1 frequency, and the content shown on the other lens is displayed at F2 frequency.

In some embodiments, the first digital display and the second digital display are configured to operate at a same frequency, either the F1 or the F2, once every recalibration cycle for a duration as a mono operating frequency duration. By intentionally operating the first digital display and the second digital display to operate at the same frequency (e.g., F1 frequency), it allows the brain of a subject to phase-lock with F1 frequency during the mono operating frequency duration. After the mono operating frequency duration, the first digital display would be refreshed at F1 frequency, and the second digital display would be refreshed at F2 frequency. The brain of the subject can now sense the differential frequency between F1 and F2 frequencies. By repeating the operation of the mono operating frequency duration for every recalibration cycle, the brain of the subject would be able to detect and maintain its recognition of the differential frequency.

In some embodiments, the recalibration cycle is between 1 to 120 minutes.

In some embodiments, the mono operating frequency duration is between 5 to 20 seconds.

BRIEF DESCRIPTION OF THE DRAWINGS

The accompanying drawings are included to aid further understanding of the present disclosure and are incorporated in and constitute a part of the present disclosure. The drawings illustrate a select number of embodiments of the present disclosure and, together with the detailed description below, serve to explain the principles of the present disclosure. It is appreciable that the drawings are not necessarily to scale, as some components may be shown to be out of proportion to size in actual implementation in order to clearly illustrate the concept of the present disclosure.

DETAILED DESCRIPTION OF PREFERRED EMBODIMENTS

Overview

Figures 1, 2:
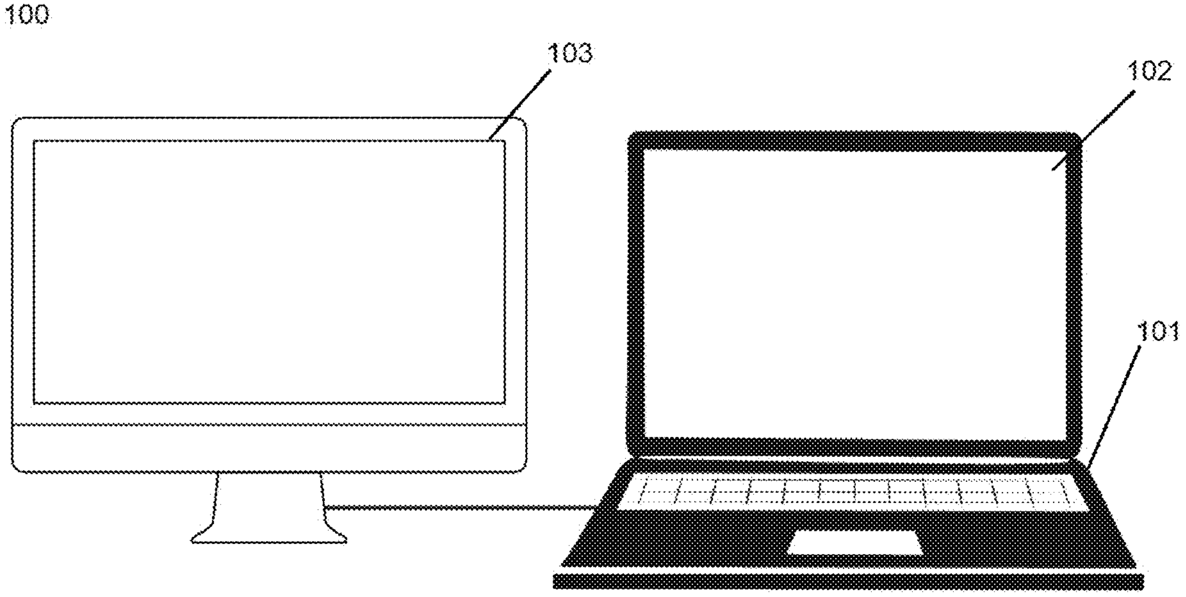
FIG. 1 schematically depicts an embodiment of the present disclosure.
FIG. 2 shows the experiment data of such embodiment.

Various implementations of the present disclosure and related inventive concepts are described below. It should be acknowledged, however, that the present disclosure is not limited to any particular manner of implementation, and that the various embodiments discussed explicitly herein are primarily for purposes of illustration. For example, the various concepts discussed herein may be suitably implemented in a variety display systems having different form factors.

A display system comprises a first digital display, a second digital display, and a host computer. The first digital display is configured to operate at a first refresh frequency (F1)>50 Hz, and the second digital display is configured to operate at a second refresh frequency (F2), greater than F1. The difference between the F1 and the F2 may be either between 35 Hz and 45 Hz (e.g., 40 Hz) or between 3 Hz and 10 Hz (e.g., 7 Hz). The host computer controls and manages the first digital display and the second digital display.

Example Implementations

FIG. 1 shows an embodiment of the display system of the present disclosure 100. The laptop computer 101 has an integrated screen 102 with 60 Hz refresh frequency. The extended monitor 103 has a 100 Hz refresh frequency. The laptop (host) computer controls and manages both its default screen (the first digital display) and the extended monitor (the second digital display). The content displayed in the default screen is not required to be correlated to the content displayed in extended monitor. For example, the default screen may show a Word document whereas the extended monitor may show a video. When a subject is viewing the default screen and the extended monitor simultaneously, the subject is exposed to the F1 (60 Hz) and the F2 (100 Hz) frequencies continually, thus creating an invisible differential frequency (equal to F2−F1=40 Hz) in the brain of the subject.

Two subjects were tested with embodiment 100 for one hour each time on two different occasions. Subject 1 is 150 cm from the laptop screen 102 and the extend monitor 103, whereas subject 2 is 100 cm from the laptop screen 102 and the extend monitor 103. Subject 1 is 30-year female and subject 2 is 30-year male. Both subjects are healthy. FIG. 2 shows the test results of these two subjects on the improvement of the gamma stimulation readings of their brains after viewing embodiment 100. They viewed screen 102 and the extended monitor 103 of embodiment 100 on two occasions that are 72 hours apart. The 72-hour rest period is intended to minimize the lasting effect of the first viewing. Research studies have shown that any gamma stimulation improvement over 1.5 dB is considered significant and useful for treating or preventing Alzheimer's disease. The smallest gamma stimulation improvement is 4.35 dB in our experiments, whereas the largest is 6.39 dB. Subject 1 is more sensitive to the gamma stimulation of embodiment 100 as compared to subject 2. The test results clearly demonstrate the potential effect and impact of the present disclosure on treating Alzheimer's disease, even with a simple setup of using a laptop computer with 60 Hz screen and a 100 Hz extended monitor. A properly designed dual display system with carefully chosen dual refresh frequencies may improve gamma stimulation on a subject even further. It is to be noted that when the refresh frequency of the extended monitor 103 is 60 Hz, 75 Hz, 80 Hz, or 120 Hz, there isn't any noticeable gamma stimulation improvement from the subjects. This is because the difference between the F1 and the F2 is outside the desirable range of 35 Hz to 45 Hz or 3 Hz to 10 Hz.

Additional and Alternative Implementation Notes

Although the techniques have been described in language specific to certain applications, it is to be understood that the appended claims are not necessarily limited to the specific features or applications described herein. Rather, the specific features and examples are disclosed as non-limiting exemplary forms of implementing such techniques.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

What is claimed is:

1. A display system comprising:

a first digital display;

a second digital display; and a host computer, wherein:

the first digital display is configured to display a content at only one refresh frequency (F1) greater than or equal to (≥) 50 Hz, the second digital display is configured to display the content at only one refresh frequency (F2) greater than (>) F1, and the host computer simultaneously operates the first digital display and the second digital display to create a gamma or theta stimulation.

2. The display system of claim 1, wherein a difference between the F1 and the F2 is between 35 Hz and 45 Hz.

3. The display system of claim 2, wherein the F1 is 60 Hz and the F2 is 100 Hz.

4. The display system of claim 2, wherein the F1 is 80 Hz and the F2 is 120 Hz.

5. The display system of claim 1, wherein a difference between the F1 and the F2 is between 3 Hz and 10 Hz.

6. The display system of claim 1, wherein the first digital display and the second digital display are configured to operate at a same frequency, either the F1 or the F2, once every recalibration cycle for a duration as a mono operating frequency duration.

7. The display system of claim 6, wherein the recalibration cycle is between 1 to 120 minutes.

8. The display system of claim 6, wherein the mono operating frequency duration is between 5 to 20 seconds.

* * * * *